US012771629B2

(12) United States Patent
Damle et al.

(10) Patent No.: US 12,771,629 B2
(45) Date of Patent: Oct. 20, 2026

(54) ENHANCED AUTOMATED ETHERNET TESTING FOR COMMUNICATION NETWORKS

(71) Applicant: Level 3 Communications, LLC, Denver, CO (US)

(72) Inventors: Durwankur Damle, Erie, CO (US); Shelli Hurd, Arvada, CO (US); Suren Rodrigues, Highlands Ranch, CO (US); Rabih Nahas, Erie, CO (US); Dayne Allen, Broomfield, CO (US); Zhuo Jing, Erie, CO (US); Brian Sanniola, Parker, CO (US); Jun Cha, Castle Pines, CO (US)

(73) Assignee: Level 3 Communications, LLC, Denver, CO (US)

( * ) Notice: Subject to any disclaimer, the term of this patent is extended or adjusted under 35 U.S.C. 154(b) by 336 days.

(21) Appl. No.: 18/762,594

(22) Filed: Jul. 2, 2024

(65) Prior Publication Data

US 2025/0016086 A1 Jan. 9, 2025

Related U.S. Application Data

(60) Provisional application No. 63/512,564, filed on Jul. 7, 2023.

(51) Int. Cl.
*H04L 43/55* (2022.01)
*H04L 41/50* (2022.01)

(52) U.S. Cl.
CPC .......... *H04L 43/55* (2022.05); *H04L 41/5032* (2013.01)

(58) Field of Classification Search
CPC ............................ H04L 41/5032; H04L 43/55
USPC .......................................................... 370/252
See application file for complete search history.

(56) References Cited

U.S. PATENT DOCUMENTS

2025/0016060 A1* 1/2025 Damle .................. H04L 41/122
2025/0016086 A1* 1/2025 Damle .................... H04L 43/50

* cited by examiner

*Primary Examiner* — Peter G Solinsky

(57) ABSTRACT

This disclosure describes systems, methods, and devices related to automated Ethernet testing for a communications network. A device may identify a service identifier of a service provided by the communications network to a customer; identify, based on the service identifier, a circuit comprising devices and interfaces used to provide the service; determine that the devices include a first device including an Ethernet transport line; present an Ethernet test panel showing an indication of the first device; receive, from the Ethernet test panel, a user request from a customer of the circuit to test the circuit; initiate a live Ethernet diagnostic on the circuit in response to the user request; receive, based on the live Ethernet diagnostic, performance metrics of the circuit; detect an occurrence of an event in the circuit; and present, based on the occurrence of the event, a notification of the event to the customer.

21 Claims, 12 Drawing Sheets

ENHANCED AUTOMATED ETHERNET TESTING FOR COMMUNICATION NETWORKS

CROSS-REFERENCE TO RELATED APPLICATION

This application is related to and claims priority under 35 U.S.C. § 119(e) from U.S. Provisional Patent Application No. 63/512,564, filed Jul. 7, 2023, titled "ENHANCED AUTOMATED ETHERNET TESTING FOR COMMUNICATION NETWORKS," the entire contents of which are incorporated herein by reference. This application is also related to U.S. Pat. No. 10,560,284, titled "SYSTEM AND METHODS FOR MAPPING A NETWORK SERVICE PATH," the entire contents of which are incorporated herein by reference for all purposes.

TECHNICAL FIELD

Embodiments of the present invention generally relate to devices, systems, and methods for automated Ethernet testing for a communications network.

BACKGROUND

Communications network providers allow for customers to troubleshoot after a product has been delivered to the customers. A customer may receive a network device and place a service call for help with the device, which may result in generation of a service ticket. To reduce the number of issued service tickets, communication network providers may use a tool that allows for proactive and customer-initiated diagnostics.

SUMMARY

A method of performing event-driven diagnostics for a communications network may include identifying, by at least one processor of a device, a service identifier of a service provided by the communications network to a customer; identifying, by the at least one processor, based on the service identifier, a persisted path for the service, the persisted path generated prior to any user request to perform a diagnostic on the service, and the persisted path including devices and interfaces used to provide the service; receiving, by the at least one processor, performance metrics of the devices and interfaces of the persisted path; detecting, by the at least one processor, without receiving any user request to perform a diagnostic on the service, based on comparisons of the performance metrics to event criteria, an occurrence of an event in the persisted path; and causing presentation, based on the occurrence of the event, a notification of the event to the customer.

A device for performing event-driven diagnostics for a communications network may include memory coupled to at least one processor, wherein the at least one processor is configured to: identify a service identifier of a service provided by the communications network to a customer; identify, based on the service identifier, a persisted path for the service, the persisted path generated prior to any user request to perform a diagnostic on the service, and the persisted path including devices and interfaces used to provide the service; receive performance metrics of the devices and interfaces of the persisted path; detect, without receiving any user request to perform a diagnostic on the service, based on comparisons of the performance metrics to event criteria, an occurrence of an event in the persisted path; and cause presentation, based on the occurrence of the event, a notification of the event to the customer.

A system for performing event-driven diagnostics for a communications network may include consuming applications, of the communications network, configured to call a mediated application programming interface (API); the mediated API configured to call APIs owned by the consuming applications; and memory coupled to at least one processor, the at least one processor configured to: identify a service identifier of a service provided by the communications network to a customer of the customers; identify, based on the service identifier, a persisted path for the service, the persisted path generated prior to any user request to perform a diagnostic on the service, and the persisted path including devices and interfaces used to provide the service; receive performance metrics of the devices and interfaces of the persisted path; detect, without receiving any user request to perform a diagnostic on the service, based on comparisons of the performance metrics to event criteria, an occurrence of an event in the persisted path; and cause presentation, based on the occurrence of the event, a notification of the event to the customer.

DETAILED DESCRIPTION

Figure 1:
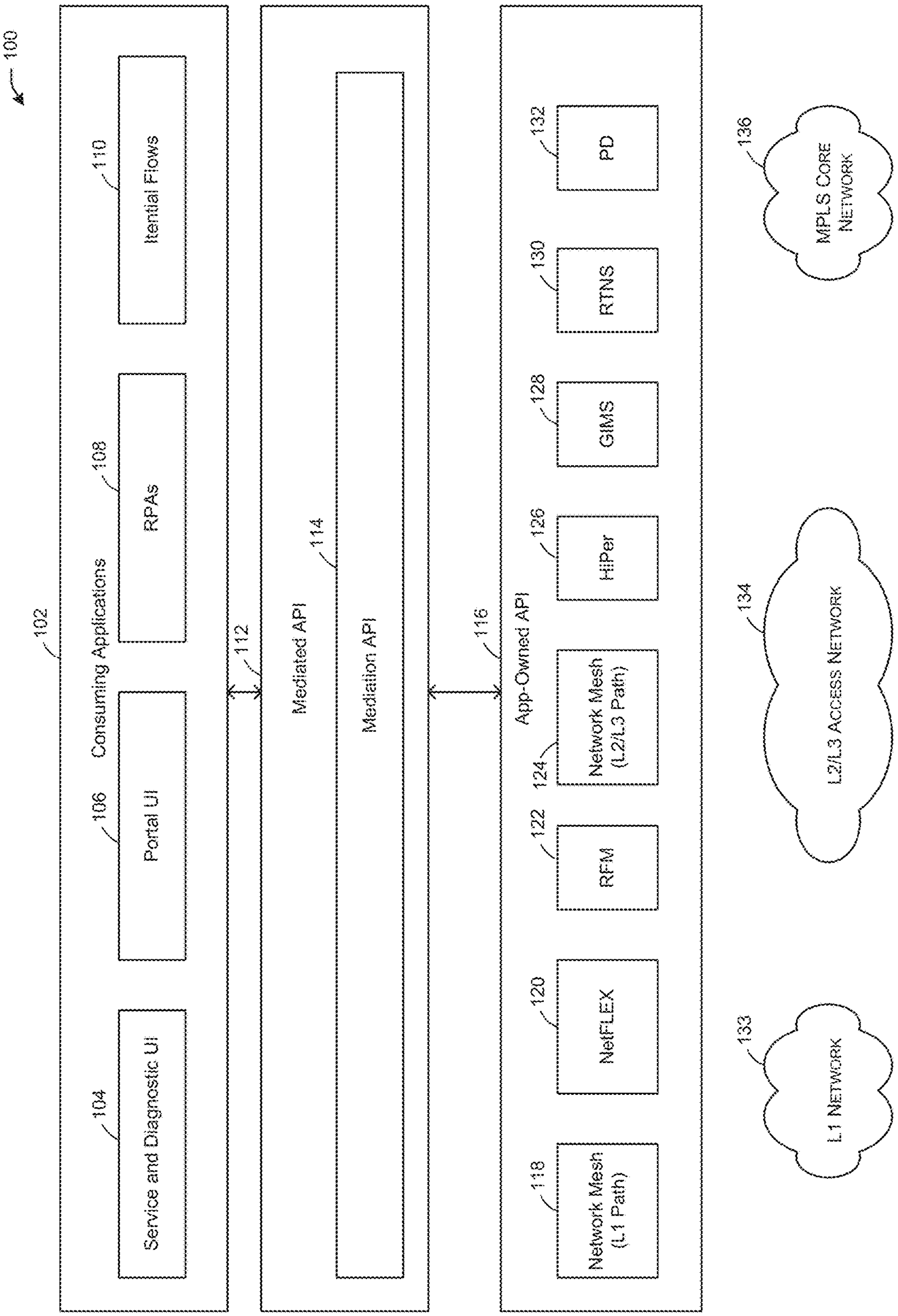
FIG. 1 illustrates an exemplary communications network architecture for service and diagnostics in accordance with one embodiment.

Aspects of the present disclosure involve devices, systems, methods, and the like, for an enhanced communications network diagnostics platform.

When a communications network provider customer purchases or leases a product from the communications network provider, the customer may contact the communications network provider for troubleshooting. The service call may result in the communications network provider generating a service ticket. Such device troubleshooting is reactive and could be more efficient.

There is therefore a need for proactive and customer-initiated diagnostics for equipment used in communications networks.

In one or more embodiments, an enhanced service and diagnostic system for communications network may retrieve information from upstream communication network systems (e.g., performance information, alarm information, service tickets, etc.), transforms the information, and generates dispositions regarding the health of a customer's service.

In one or more embodiments, the enhanced service and diagnostic system for communications network equipment may allow for communications network provider customers and technicians to quickly run real-time diagnostics and present recommended actions for troubleshooting. The enhanced service and diagnostic system may reduce isolation time and time to restore for a communications network provider, but also may provide information necessary for technicians to provide real-time information to customers. An automated process may monitor queued service tickets, and run diagnostics within minutes of a ticket being generated. After diagnostics are run, the service ticket may be updated automatically, and a real-time update (e.g., including a service diagnostic file) may be provided to a customer to communicate results of diagnostic tests and next recommended actions to resolve an issue. The enhanced service and diagnostic system may include a customer portal with which customers may automatically run diagnostics before generating a service ticket for troubleshooting. The enhanced service and diagnostic system also may include a service diagnostic application programming interface (API) that may allow a customer to integrate the functionality of the enhanced service and diagnostic system into customer systems.

In one or more embodiments, the enhanced service and diagnostic system may allow for customers to quickly self-serve with analytics such as recently scheduled maintenance, service outages, over-utilization, and circuit status. The enhanced service and diagnostic system may determine when an issue is within the communication network or within a customer's network, and determine whether a service ticket for the communication network provider is needed. In this manner, diagnostics may be proactive, and the number of service tickets may be reduced.

In one or more embodiments, the enhanced service and diagnostic system may use consuming applications such as robotic process automation (RPAs), a user interface for the enhanced service and diagnostic system, a portal user interface, and itential flows. The consumer applications may call a mediated API, which may call application-owned APIs.

In one or more embodiments, the enhanced service and diagnostic system may include support of software-defined wide area networks (SD-WANs) for unique insights, algorithms, and disposition of service. The enhanced service and diagnostic system may include T1 testing with unique summarization and results, Ethernet testing with unique summarization and results, network configuration file flattening with extrapolation and algorithms, network diagnostics with unique algorithms and insights into network element health, and event-driven diagnostics (e.g., mass diagnostics, service level agreement-driven diagnostics, proactive diagnostics, etc.). For example, T1 intrusive testing may be automated because T1 testing may be difficult for someone to run, resulting in difficult to understand codes in response to running the testing. The enhanced service and diagnostic system for communications network may identify when the testing may be performed, on which devices and interfaces, automatically executes the testing, and translates the testing results into information that is understandable to the customer. Such results may be combined with other information (e.g., information that does not account for T1 testing) that may be used to score the health of a customer's service. SD-WAN products may be less difficult to test that T1 products, but SD-WAN testing also may be automated and the results translated for easy understanding. In addition, T1 testing may test not only when a ticket is open, but also based on a user request. A service ticket may be generated when a user requests one, and running a test may require a service ticket with a corresponding identifier.

In one or more embodiments, the event-driven service health diagnostics may be proactive, predictive, and restorative rather than reactive. Instead of a service status being request-driven in which a user request launches a sequence of collections that results in a service status, customer services may be decomposed to their path components in a pre-built persisted path database associated by service. Events, such as performance metrics-based thresholds, may be fed into a disposition rules engine that may update a service status database. In some cases, a resolution engine may resolve/mitigate an impairment. Event types may include equipment failure, natural events (e.g., flooding), and others (e.g., fiber cuts, etc.). A layer-one network may have transport layer devices, and multiprotocol label switching (MPLS) may connect devices from different networks to deliver services across locations. Logic for the diagnostics may be customized for different locations, and may prioritize issues to be addressed when multiple issues are identified with the enhanced diagnostics.

In one or more embodiments, the persisted path may enable ability to overlay events (e.g., fault, performance, etc.) for near real-time diagnostics. For example, instead of computing a path an run time an experiencing delay while waiting for the path to be generated, the enhanced service and diagnostic system may use a service identifier and actual network data to generate a persisted path. For example, a persistent path may be based on a service identifier (e.g., edge devices using traffic for a service indicated by the service identifier). Other systems may incur a significant delay in providing a network path because they may compute the path at run-time. In addition, other systems may use a "design" system rather than the actual network data, and therefore may be less accurate than the enhanced systems and methods herein. The enhanced persistent path herein may enable an ability to overlay events (e.g., fault/performance) for near real-time diagnostics, providing a significant improvement over existing techniques.

In one or more embodiments, the enhanced persistent path herein may use network-based adjacency relationships that may be stitched together to generate an end state of provider edge (PE) to customer edge (CE). The individual adjacencies that may be discovered may include, for various interfaces and protocols, including but not limited to, pe_to_mc (provider edge to metro core), mc_to_mc, mc_to_me (metro edge), mc_to_ma, mo_to_nid (e.g., metro off-network to network interface device), ma to me, and pe_to_mcpe (metro core provider edge).

A cluster environment may be generated based on the adjacencies, and non-cluster members (e.g., false positives) may be removed. For example, clusters could include adjacencies for a particular network device (e.g., a service router, etc.). The network may guess which service point is next in the path, and may not be dependent on network inventory itself. The MAC addresses of the devices may not be needed to provide device ordering. Diagnostics may lay over a network path, but the path takes time to establish. The enhancements herein reduce the bottleneck and provide an improved network path estimate.

In one or more embodiments, diagnostics data may be retrieved from network elements, an inventory system, and third party element management systems. A SD-WAN overlay may have visibility to these elements and systems in a hybrid manner, meaning that the service provider may provide the SD-WAN overlay. In a layer-three service, the provider edge (PE) may be on top in a service part module (SPM) path, and the PE interface may have an Internet protocol defined in SPM. A layer-two service may start from one handoff and end with another handoff. Multiple user network interface (UNI) types may be paired with each other. Some UNIs including PE+MC (master controller)+ network interface device (NID) or metro edge handoff may be eligible for enhanced diagnostic testing.

In one or more embodiments, the enhanced service and diagnostic system may support vendor-agnostic SD-WAN overlay as a functional integration using an automated software container orchestration system for automating software deployment, scaling, and management. The SD-WAN fabric may include a SD-WAN overlay virtual private network (VPN) with MPLS and the Internet connecting a branch to a datacenter. The SD-WAN overlay may allow analytics clusters across multiple vendors with end-to-end visibility across serial numbers of SD-WAN equipment, and may recommend billing action if equipment is found with active customer applications running. In this manner, customer experience may be improved along with operational efficiencies and service ticket deflection. The automated software container orchestration system may provide a one stop shop to aid secure access to SD-WAN systems and ensure centralized governance of access, data, insights, and scalability.

In one or more embodiments, for SD-WAN, there may be a single point of overlay architecture (e.g., a bolt-on integration). The enhanced service and diagnostic system for communications network may determine what access may be used by various customer networks. A REST API may be used to access analytics for SD-WAN fabric. What may be seen in the API interface from the diagnostic ecosystem may include SD-WAN information, including what type of device and/or interface. There may be a mesh ecosystem, including a VPN to SD-WAN to mesh. Rules may be needed to stitch together information from multiple sources, such as to define a sequence of API calls to retrieve the data from the sources, to identify the PE edge router as a launch point, to use the SPM to stitch the information (e.g., given a SD-WAN, rules may define where to retrieve the information and which devices and interfaces are part of the SD-WAN overlay).

In one or more embodiments, in one example, a customer may query a circuit under service for diagnostics. The enhanced service and diagnostic system may send a related device and interface list to a SPM, which may perform discovery and may return a SPM path. Based on the SPM path, the enhanced service and diagnostic tool may display an Ethernet test panel. From the Ethernet test panel, the customer may select a test, such as “validate circuit information.” If the customer’s device is on a connection list and is a handoff device, the enhanced service and diagnostic tool may retrieve attributes. As a result, the enhanced service and diagnostic tool may enable customer selection of eligible devices and interfaces for selection. When the customer selects “test circuit,” the enhanced service and diagnostic tool verify that a UNI has been selected, confirm with the customer than an intrusive test may begin, trigger a test on the circuit, and display test results to the customer.

In one or more embodiments, Table 1 below represents event-driven diagnostic examples leveraging auto-generated performance-related events:

TABLE 1

Event-Driven Diagnostics:

EVENT types

| Network/Service Context | Metric | Event Generation Criteria Examples only: experience and SLAs (Service Level Agreements) may drive thresholds |
|---|---|---|
| PE to CE (provider edge to customer edge) | Packet Delivery | Delivery less than 99% over the last 24 hours. |
| PE to CE | CE WAN interface errors | For each WAN interface Errors are >= 5 (avg 1 error/minute) |
| hand-off to customer equipment | CE LAN interface errors | Errors are >= 5 (avg 1 error/minute) |
| utilization | utilization | Elevated Risk: if observed intervals are: <15M >= 50% utilization >=15M < >=70% utilization |

In one or more embodiments, when an event enters the event process, the enhanced service and diagnostic system may evaluate the event against the criteria in Table 2 below.

TABLE 2

Event Evaluation:

| Packet Delivery or WAN Interface Errors | CE LAN Errors | PE Utilization | Disposition -> Next Steps |
|---|---|---|---|
| Pass | Pass | Low Risk | Refer back to customer - no trouble found<br>Not the provider network issue.<br>Not an issue at the provider.<br>Not an overutilization issue of this service.<br>IT level assistance required to investigate customer network<br>Customer to use internal or third party OR Technician available to assist if requested. |
| Pass | Pass | Elevate Risk | Refer back to customer - no trouble found<br>Not the provider network issue.<br>Not an issue at the telecom demarcation point<br>Not an overutilization issue of this service.<br>IT level assistance required to investigate customer network<br>Customer to use internal or third party OR Technician available to assist if requested. |
| Fail | Pass | Low Risk | Provider responsibility to resolve.<br>Not an issue at the provider demarcation point<br>Cannot conclude if utilization is an issue as path error retransmits may have reduced the overall throughput available to the customer applications. |

TABLE 2-continued

| Event Evaluation: | | | |
|---|---|---|---|
| Packet Delivery or WAN Interface Errors | CE LAN Errors | PE Utilization | Disposition -> Next Steps |
| Fail | Pass | Elevated Risk | Check CE<br>WAN errors. If errors seen, this increases the chances that it is a path error. With Utilization at Low Risk, packet delivery is unlikely due to packet discards.<br>With Elevated Customer Utilization and Packet Delivery failures., more than likely this is a customer utilization issue.<br>Not an issue at the provider demarcation point<br>Check CE<br>WAN errors. If there are errors, there may be multiple issues impacting the customer's applications. Provider to resolve issues around WAN interface errors.<br>With the ambiguity of what could be causing the packet delivery problems (utilization and/or path errors), also check queue discards - if there are also a high level of queue discards, there is more than likely utilization issues.<br>Next Steps: Refer back to customer:<br>To purchase additional bandwidth, contact sales team<br>If IT level assistance required to investigate their network:<br>Customer to use internal or third party OR CCT available to assist if requested. |
| Pass | Fail | Pass | Issue at the hand-off to customer - very often duplex issue<br>Not a provider network issue<br>Not an issue at the provider demarcation point<br>Next Steps: No conclusion as to whether overutilization will be an issue as possible retransmits due to errors on the CE<br>LAN interface may reduce the overall throughput for the customer's applications.<br>IT level assistance required to investigate their network<br>Customer to use internal or third party OR Technician available to assist if requested. |

In one or more embodiments, network diagnostics performed by the enhanced service and diagnostic system for communications network may be similar to the service diagnostics described above, but specifically for health of a physical device. The networks diagnostics may allow a customer or technician to see a configuration slice of a device in multiple ways, such as extracting border gateway protocol (BGP) components of a router for viewing. In another example, IP address information may be extracted from a device and presented. The enhanced service and diagnostic system for communications network may extract and identify the information that the system determines is most useful to the customer.

In one or more embodiments, the enhanced service and diagnostic system for communications network may be an on-demand service or may be proactive by listening for diagnostics-related events, and may automatically update the information with real-time customer notification of detrimental events related to the customer's services. Events may be network-related, weather related, world event related, etc.

In one or more embodiments, because performance of all diagnostics on all network services of a customer may require a significant number of APIs to run on a regular basis, the persisted path may be pre-built to a service and disposition rules engine. Customers may subscribe to certain diagnostics and notifications, and the tests may be performed on the ones selected by/subscribed to by the customer. When events are detected, the system may determine whether a disposition has changed and may notify when the customer has subscribed to such notification. The overlay over the network may allow for testing without slowing the network.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an exemplary communications network architecture 100 for service and diagnostics in accordance with one embodiment.

Referring to FIG. 1, the communications network architecture 100 may include consuming applications 102, such as a service and diagnostic user interface (UI) 104, a portal UI 106, RPAs 108, and itential flows 110. The consuming applications 102 may access a mediated API 112, which may have a mediation API 114 which may access application-owned APIs 116. The application-owned APIs 116 may include a network mesh 118 (e.g., L1 path), a network automation platform 120, a remote function module 122, a network mesh 124 (e.g., a L2/L3 path), a high-performance application 126, a GIMS 128, a RTNS 130, and a PD 132. The communications network architecture 100 include a L1 network 133 (layer-1 network), a L2/L3 network 134 (e.g., layer-two/layer-three network), and a MPLS core network 136.

In one or more embodiments, the communications network architecture 100 may use the consuming applications 102 to call the mediated API 112, which may call the application-owned APIs 116.

Figure 2:
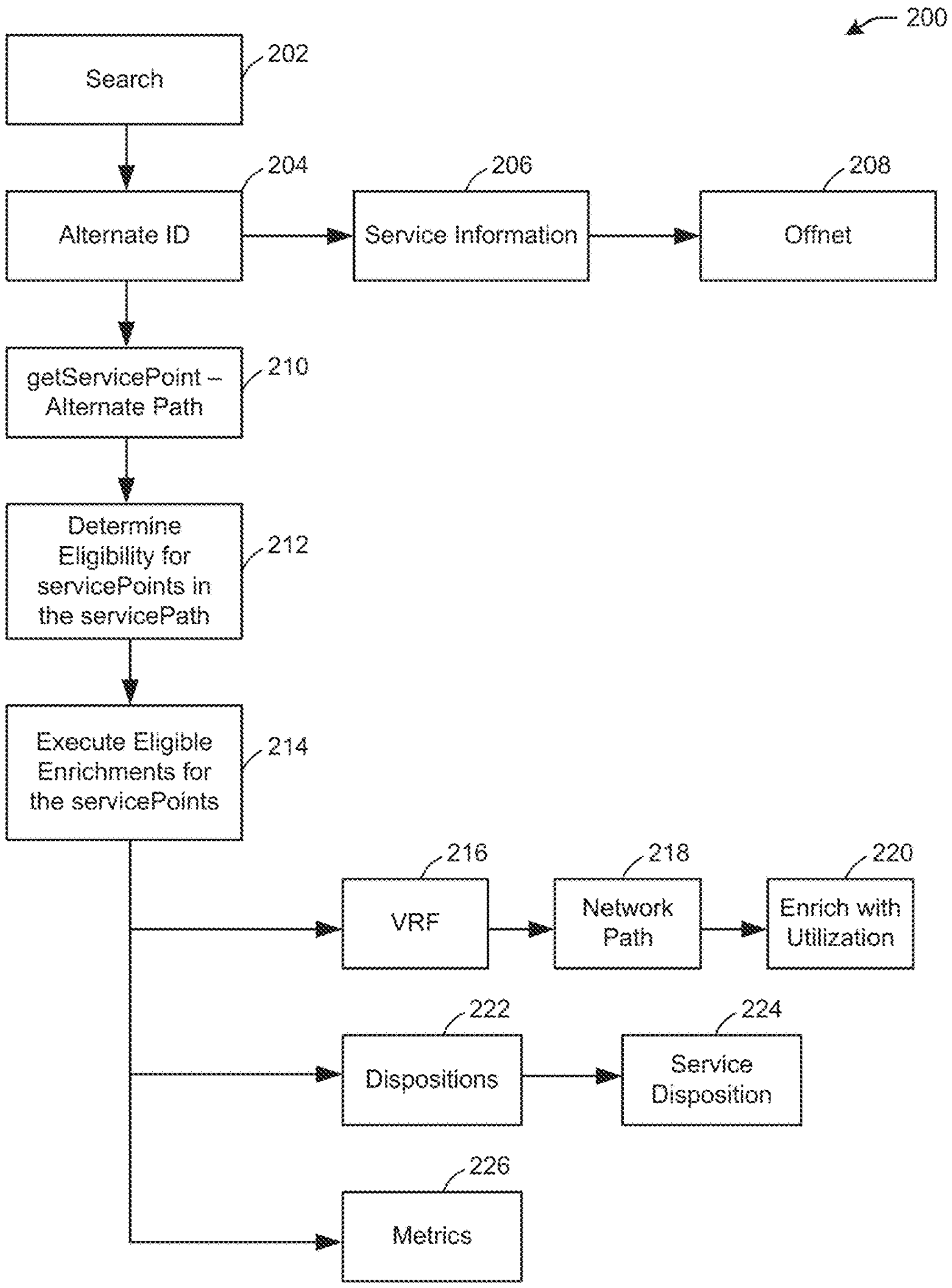
FIG. 2 illustrates an example process for service and diagnostics in accordance with one embodiment.

FIG. 2 illustrates an example process 200 for service and diagnostics in accordance with one embodiment.

Referring to FIG. 2, the process 200 may include a search at block 202 (e.g., triggered by a user) using a service identifier. At block 204, the process 200 may identify an alternate identifier, and using the alternate identifier, may identify service information at block 206, and may search offNet carriers for the corresponding service. At block 210, the process 200 may retrieve, using a getServicePoint call, an alternate service path at block 210 using the alternate identifier. At block 212, the process 200 may include determining eligibility for each service point in the service path (e.g., BPG, PING, interface status, event, utilization rate, etc.), each of which may be performed in parallel. At block 214, the service path may be generated by executing eligible enrichments for the identified servicePoints. At block 216, the process 200 may identify the VRF, generate a network path a block 218, and enrich with utilization at block 220. At block 222, the process 200 may include execution and disposition at block 222 (e.g., BPG, PING, interface status, event, utilization rate, etc.), each of which may be performed in parallel, at block 224, service disposition. At block 226, the process may include high performance metrics (e.g., utilization, latency, packet delivery, etc.).

Figure 3:
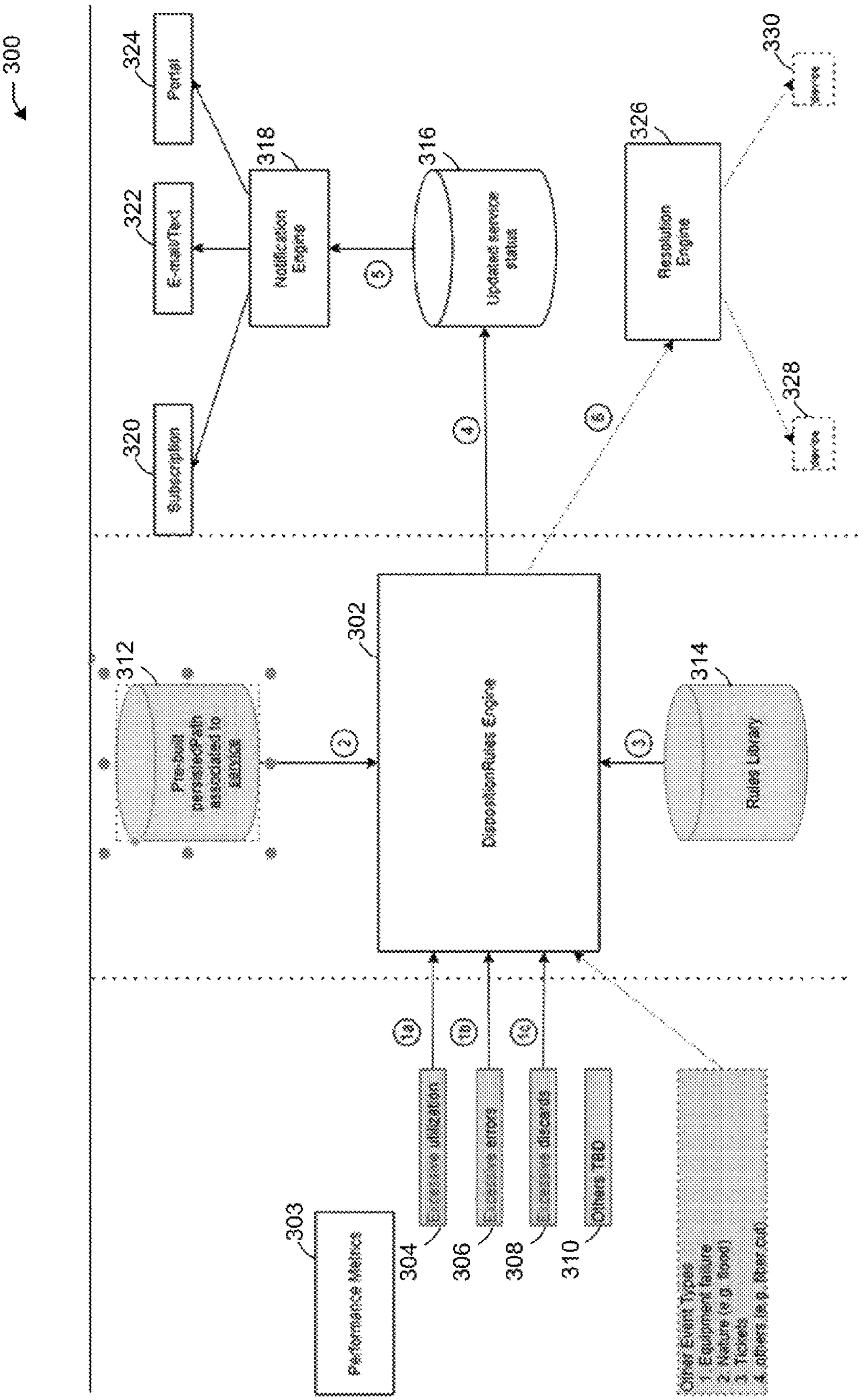
FIG. 3 illustrates an exemplary system for event-driven service health assessment using persistent paths in accordance with one embodiment.

FIG. 3 illustrates an exemplary system 300 for event-driven service health assessment using persistent paths in accordance with one embodiment.

Referring to FIG. 3, the system 300 may include a disposition/rules engine 302 that receives performance metrics 303, such as excessive utilization 304, excessive errors 306, excessive discards 308, and other performance metrics 310 (e.g., equipment failure, natural events, service tickets, fiber cuts, etc.). Based on pre-built persistent paths to an associated service, as stored in a data storage 312 (e.g., corresponding to the data storage 230 of FIG. 2) and a rules library 314, the disposition/rules engine 302 may determine an updated service status, to be stored in data storage 316, for a given service identifier. The updated service status may be provided to a notification engine 318, which may provide notifications using a subscription 320, email/text message 322, and/or a portal 324. In addition, a resolution engine 326 may resolve issues with a service (e.g., service 328, service 330) based on issues identified by the disposition/rules engine 302.

Figure 4:
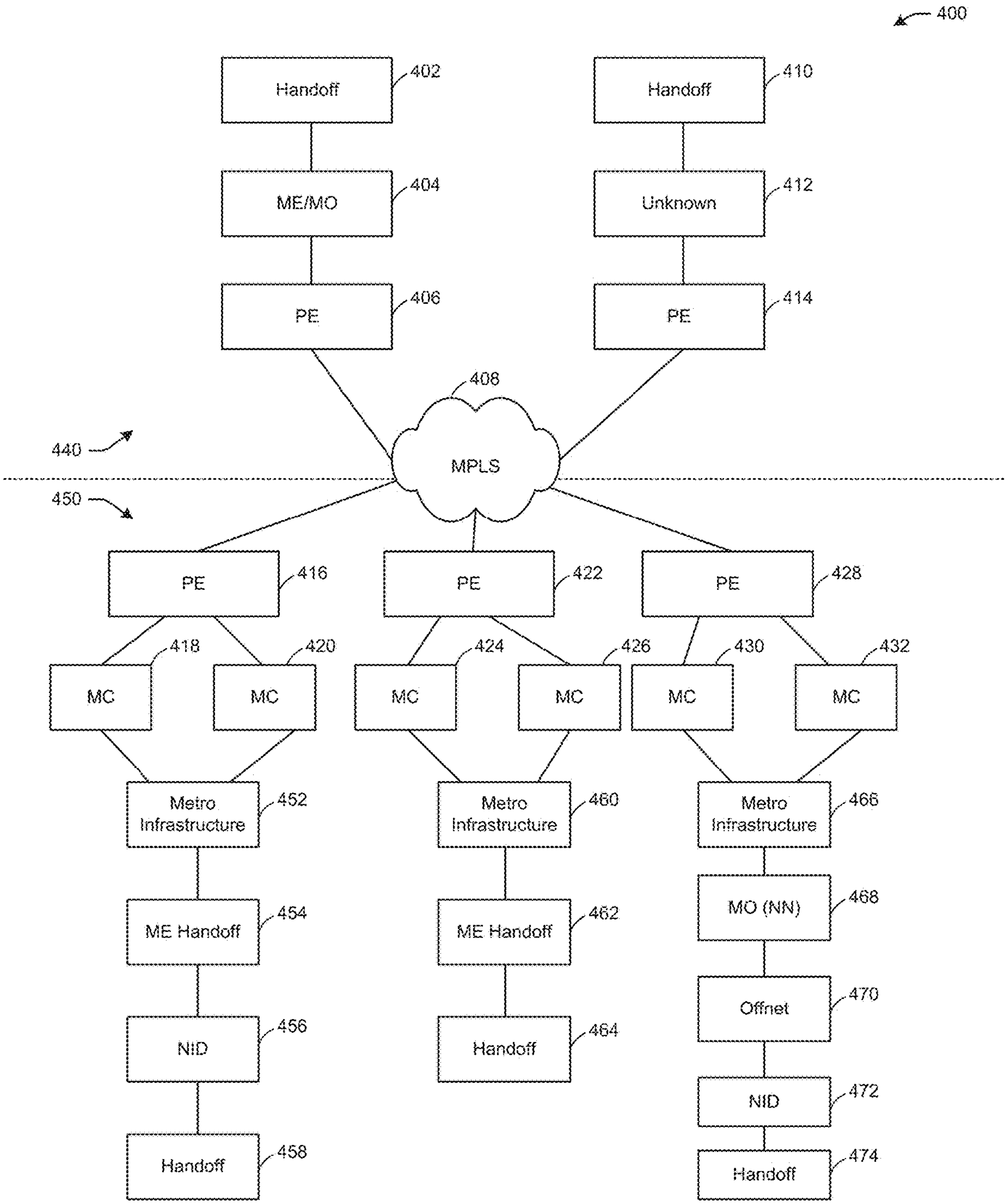
FIG. 4 illustrates an exemplary communications network architecture for layer-two service and diagnostics in accordance with one embodiment.

FIG. 4 illustrates an exemplary communications network architecture 400 for layer-two service and diagnostics in accordance with one embodiment.

Referring to FIG. 4, the communications network architecture 400 may include a handoff 402 for a ME/MO 404 (metro edge/metro offnet) and a provider edge 406, which may connect to a MPLS 408. A handoff 410 for an unknown device 412 and a PE 414 may connect to the MPLS 408. The MPLS 408 may connect to a PE 416, which connect to a MC 418 and a MC 420. The MPLS 408 may connect to a PE 422, which may connect to a MC 424 and a MC 426. The MPLS 408 may connect to a PE 428, which may connect to a MC 430 and to a MC 432. A test-ineligible layer-2 UNI 440 may include the handoff 402, the ME/MO 404, the PE 406, the handoff 410, the unknown 412, and the PE 414. A test-eligible layer-2 UNI 450 may include the PE 416, the MC 418, the MC 420, the PE 422, the MC 424, the MC 426, the PE 428, the MC 430, and the MC 432. In this manner, the MPLS 408 may connect the test-ineligible layer-2 UNI 440 to the test-eligible layer-2 UNI 450.

Still referring to FIG. 4, the MC 418 and the MC 420 may connect to a metro infrastructure 452, which may connect to a ME handoff 454, which may connect to a NID 456, which may connect to a handoff 458. The MC 424 and the MC 426 may connect to the metro infrastructure 460, which may connect to a ME handoff 462, which may connect to a handoff 464. The MC 430 and the MC 432 may connect to a metro infrastructure 466, which may connect to a MO (NN) 468, which may connect to an offnet 470, which may connect to a NID 472, which may connect to a handoff 474.

In one or more embodiments, a layer-2 service may start from one of the handoffs and may end with another of the handoffs. Any of the five UNI types (e.g., a UNI with the handoff 402, the ME/MO 404, and the PE 406, a UNI with the handoff 410, the unknown device 412, and the PE 414, a UNI with the PE 416 through the handoff 458, a UNI with the PE 422 through the handoff 464, and a UNI with the PE 428 through the handoff 474), may be paired with each other via the MPLS 408. As shown, only the UNI including a PE+MC+(NID or ME handoff) may be eligible for testing.

Figure 5:
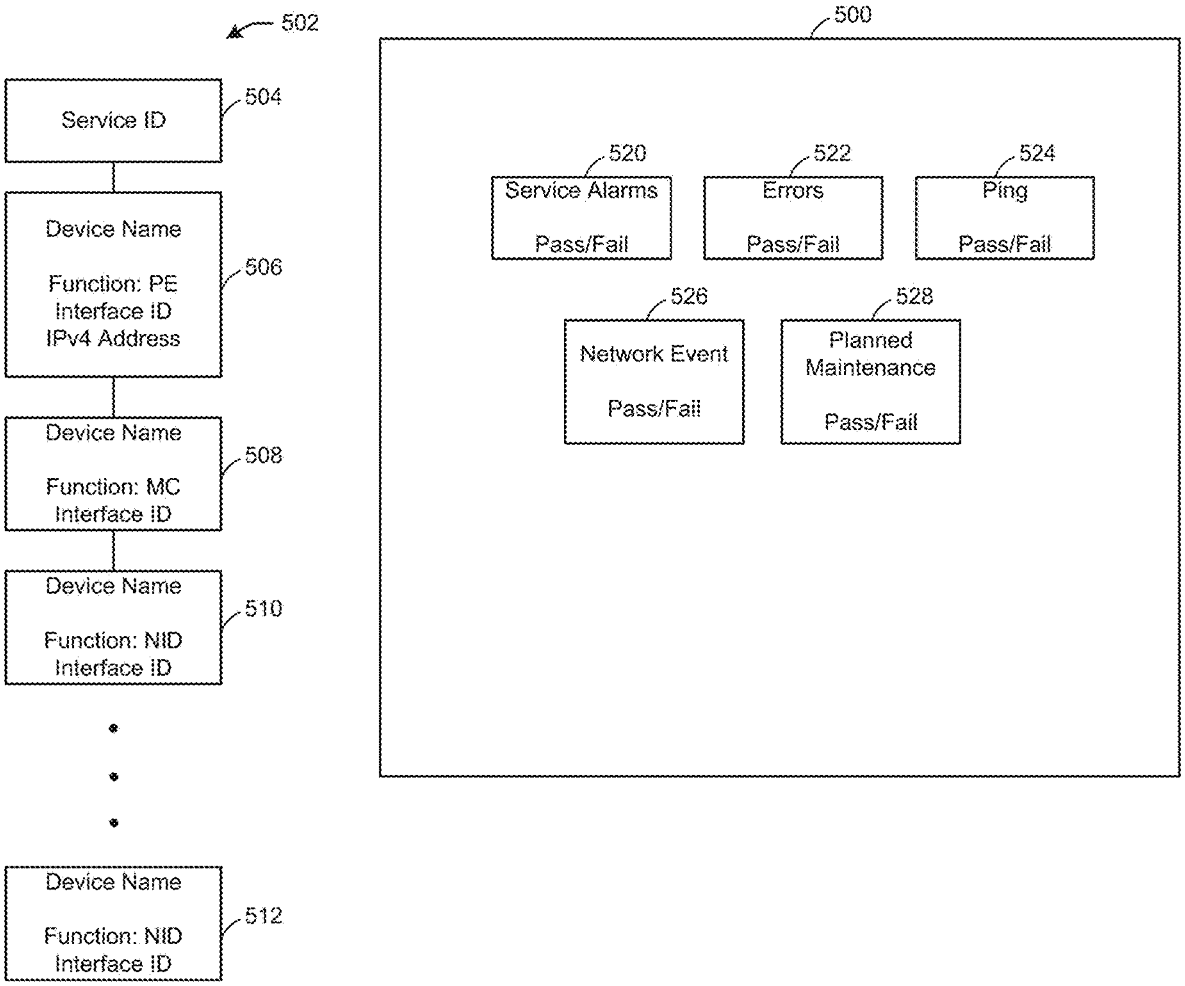
FIG. 5 illustrates an example communications network interface for service and diagnostics in accordance with one embodiment.

FIG. 5 illustrates an example communications network interface 500 for service and diagnostics in accordance with one embodiment.

Referring to FIG. 5, the communications network interface 500 may present tests and results for a flow 502 in which, for a service identifier 504, a service path with multiple devices (e.g., device name 506, device name 508, device name 510, . . . , device name 512). For the devices of the service path (e.g., a persisted path), the communications network interface 500 may present the tests and their results (e.g., pass/fail), such as a service alarms test 520, errors 522, ping 524, network event 526, and planned maintenance 528 (e.g., whether planned maintenance has occurred or not).

Figure 6:
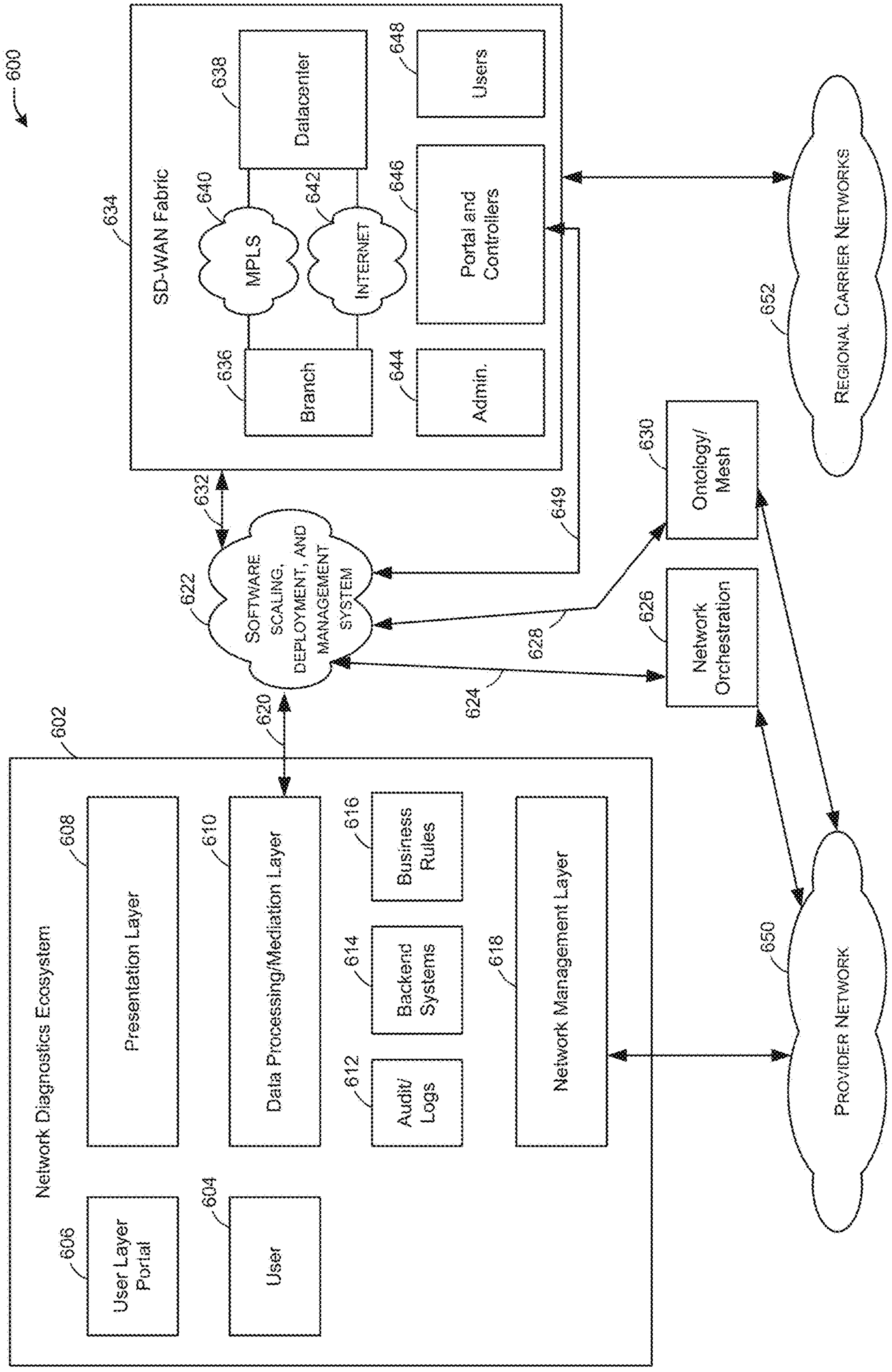
FIG. 6 illustrates an exemplary communications network architecture for service and diagnostics with software-defined wide area network (SD-WAN) overlay in accordance with one embodiment.

FIG. 6 illustrates an exemplary communications network architecture 600 for SD-WAN overlay in accordance with one embodiment.

Referring to FIG. 6, the communications network architecture 600 may include a network diagnostics ecosystem 602 with a user 604 who may access a user layer portal 606 (e.g., the portal UI 106 of FIG. 1), which may access a presentation layer 608, which may access a data processing/mediation layer 610 (e.g., the mediation API 114 of FIG. 1), which may have access to audit/logs 612, backend systems 614, business rules 616, and a network management layer 618. The data processing/mediation layer 610 may use an API 620 to access a software scaling, deployment, and management system 622, which may use an API 624 to access a network orchestration system 626, and may use an API 628 to access an ontology/mesh 630. The software scaling, deployment, and management system 622 may use an API 632 to access a SD-WAN fabric 634, which may use a network overlay.

Still referring to FIG. 6, the SD-WAN fabric 634 may include a branch 636 may access a datacenter 638 using a MPLS 640 and the Internet 642. The SD-WAN fabric 634 may include an administrator 644, a portal and controllers 646, and users 648. The software scaling, deployment, and management system 622 may access the portal and controllers 646 using an API 649. In addition the network orchestration system 626 and the ontology/mesh 630 may access a provider network 650. The SD-WAN fabric 634 may access regional carrier networks.

In one or more embodiments, diagnostics data may be retrieved from network elements, an inventory system, and third party element management systems. The SD-WAN fabric 634 may have visibility to these elements and systems in a hybrid manner, meaning that the service provider may provide the SD-WAN fabric 634. In a layer-three service, the provider edge (PE) may be on top in a service part module (SPM) path, and the PE interface may have an Internet protocol defined in SPM. A layer-two service may start from one handoff and end with another handoff. Multiple user network interface (UNI) types may be paired with each other (e.g., FIG. 4).

In one or more embodiments, the SD-WAN fabric 634 may serve as an overlay for functional integration using an automated software container orchestration system for automating software deployment, scaling, and management. The SD-WAN fabric 634 may include a SD-WAN overlay virtual private network (VPN) with MPLS and the Internet connecting a branch to a datacenter. The SD-WAN overlay may allow analytics clusters across multiple vendors with end-to-end visibility across serial numbers of SD-WAN equipment, and may recommend billing action if equipment is found with active customer applications running. In this manner, customer experience may be improved along with operational efficiencies and service ticket deflection. The communications network architecture 600 may provide a one stop shop to aid secure access to SD-WAN systems and ensure centralized governance of access, data, insights, and scalability.

In one or more embodiments, for SD-WAN, there may be a single point of overlay architecture (e.g., a bolt-on integration). The communications network architecture 600 may determine what access may be used by various customer networks. A REST API (e.g., the API 632) may be used to access analytics for the SD-WAN fabric 634. What may be seen in the API interface from the diagnostic ecosystem may include SD-WAN information, including what type of device and/or interface. There may be a mesh ecosystem, including a VPN to SD-WAN to mesh. Rules may be needed to stitch together information from multiple sources, such as to define a sequence of API calls to retrieve the data from the sources, to identify the PE edge router as a launch point, to use the SPM to stitch the information (e.g., given a SD-WAN, rules may define where to retrieve the information and which devices and interfaces are part of the SD-WAN overlay).

Figure 7:
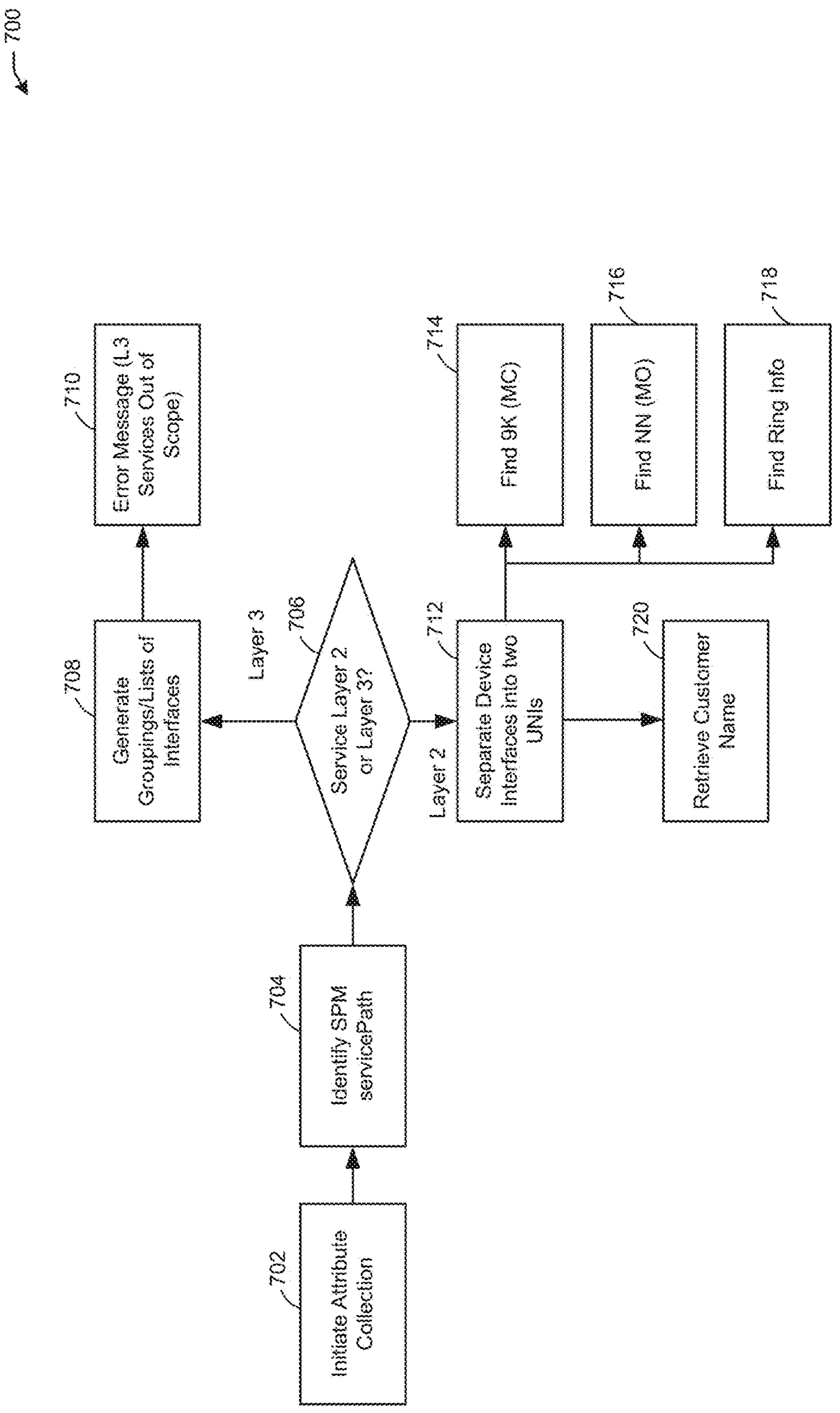
FIG. 7 illustrates an example process for layer-two service and diagnostics in accordance with one embodiment.

FIG. 7 illustrates an example process 700 for layer-two service and diagnostics in accordance with one embodiment.

Referring to FIG. 7, the process 700 may include, at block 702, initiating an attribute collection. At block 704, the process 700 may identify a SPM servicePath, which may return a service path. At block 706, the process 700 may determine whether the identified service path is Layer-2 or Layer-3. When the service path is Layer-3, at block 708, the process 700 may at block 708 generate groupings/lists of interfaces of interest for the Layer-3 service path. When Layer-3 services are out of scope, at block 710 the process 700 may include presenting an error message indicating that the L3 services are out of scope. When the service path is Layer-2, block 712 may separate device interfaces of the identified service path into two UNIs. For each UNI, at block 714, the process 700 may identify metro controller devices in the service path (e.g., 9K controllers). At block 716, the process 700 may, for each UNI, identify metro offnet controllers, and at block 718 may, for each UNI, identify ring information. At block 720, for the Layer-2 service, the process 700 may retrieve a customer name and save it as an account name.

Figure 8:
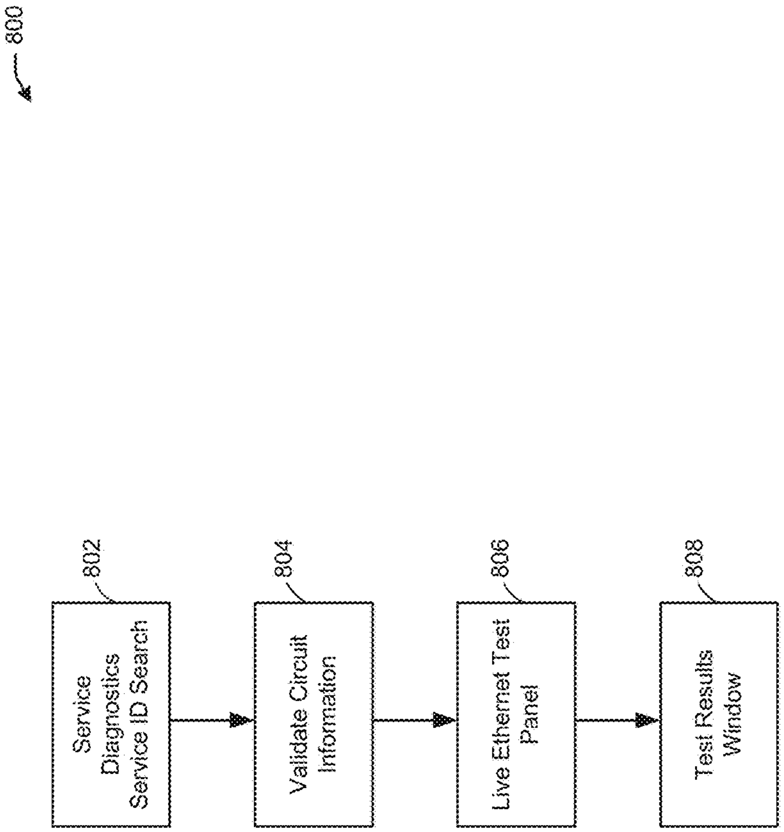
FIG. 8 illustrates an example process for Ethernet testing in accordance with one embodiment.

FIG. 8 illustrates an example process 800 for Ethernet testing in accordance with one embodiment.

Referring to FIG. 8, at block 802, the process 800 may perform a service diagnostics service identifier search in which a user may query a circuit under service diagnostics. A SPM may perform discovery and return a SPM path, and may display a test panel for the devices and interfaces in the service path. At block 804, the process 800 may validate circuit information. For example, when the user selects a test/validation from the presented test panel, the process 800 may verify the circuit, retrieve the relevant attributes, and allow the user to confirm a live (and invasive) Ethernet (T1) test at block 806. At block 808, the process 800 may present a test results window that shows the results of the test and whether the test was successful.

Figure 9A:
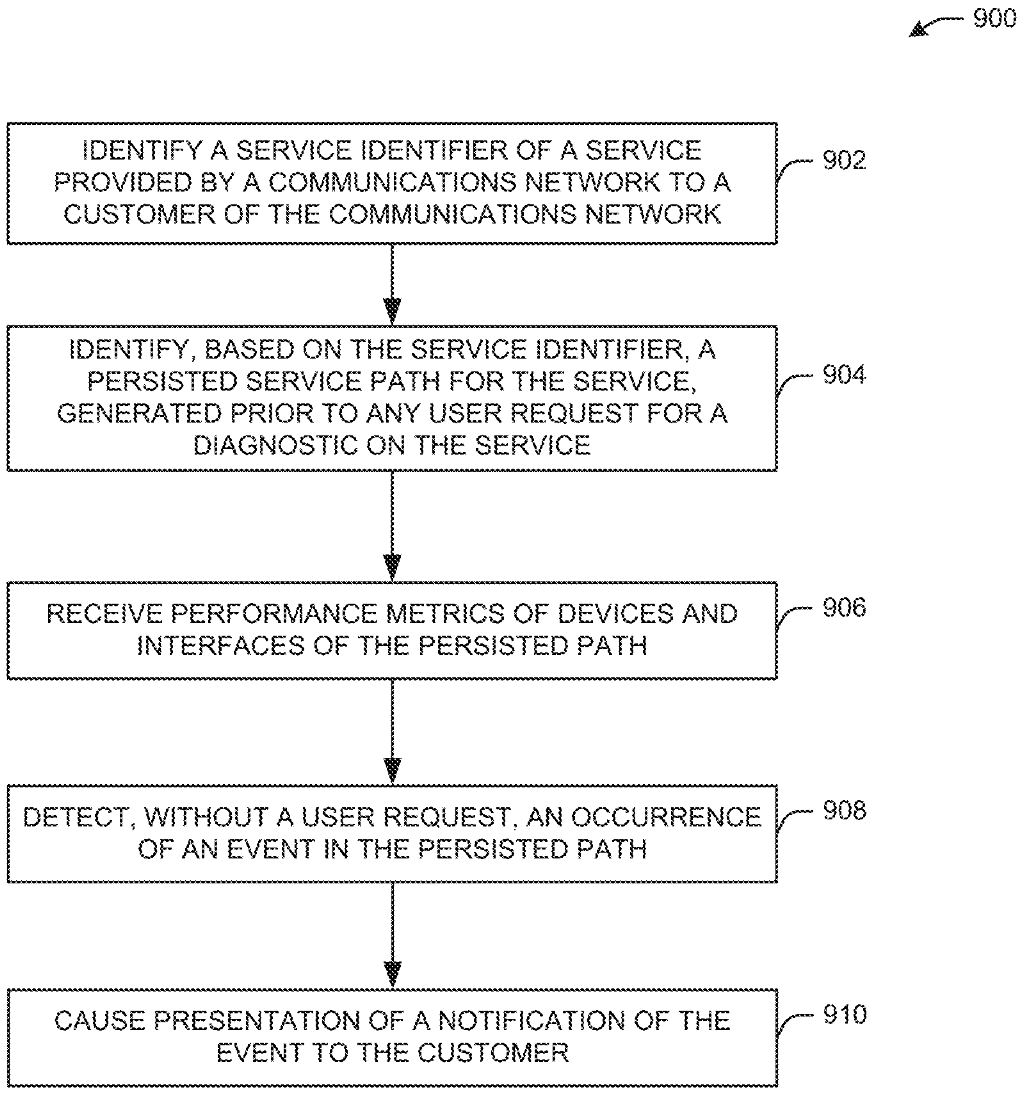
FIGS. 9A-9C are flowcharts illustrating a process for event-driven diagnostics for communications networks in accordance with embodiments.

FIG. 9A is a flowchart illustrating a process 900 for event-driven diagnostics for communications networks in accordance with one embodiment.

Figure 10:
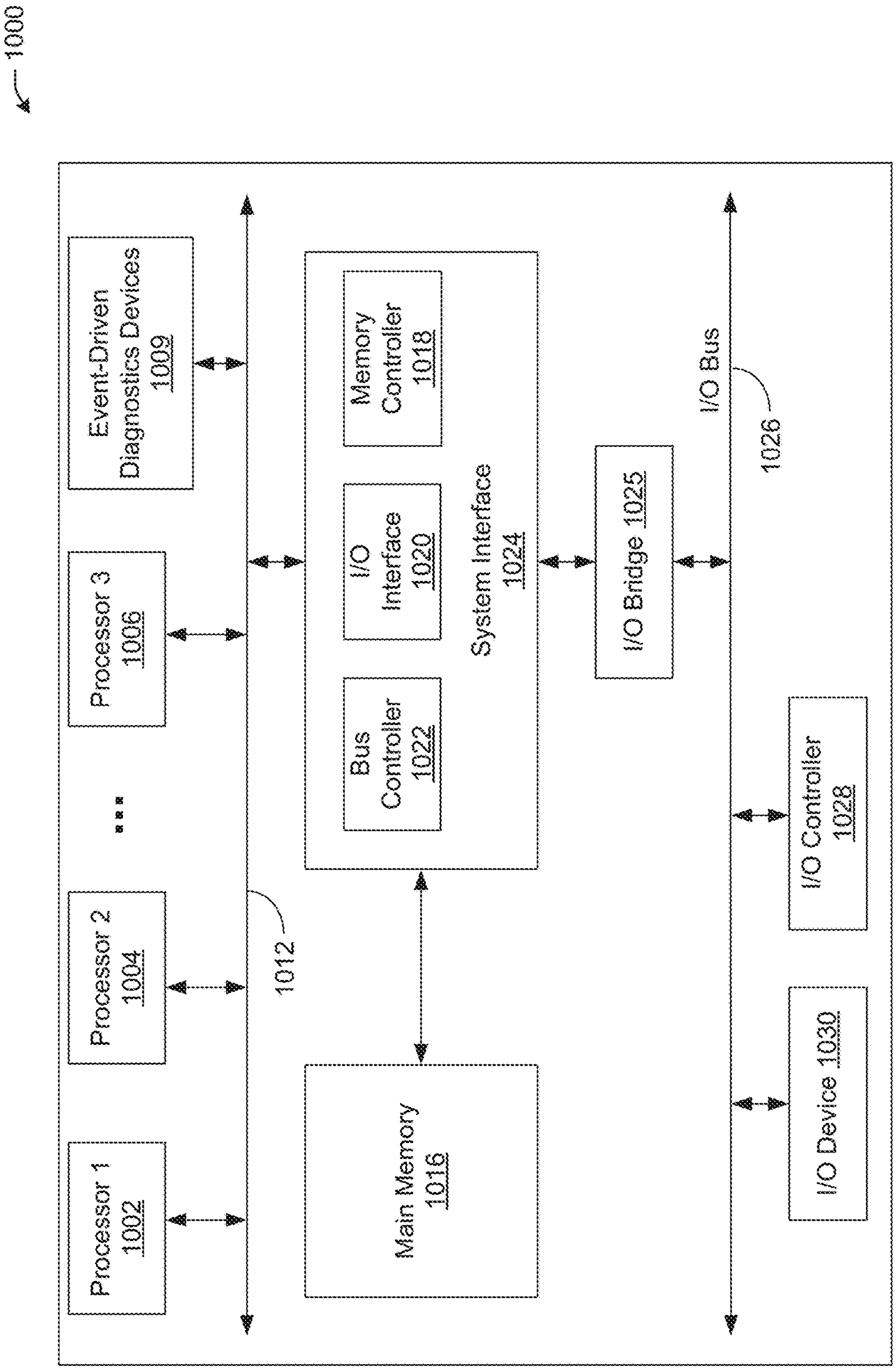
FIG. 10 is a diagram illustrating an example of a computing system that may be used in implementing embodiments of the present disclosure.

At block 902, a device (or system, e.g., the communications network architecture 100 of FIG. 1, the event-driven diagnostics devices 1009 of FIG. 10) may identify a service identifier of a service provided by a communications network to a customer. At block 904, using the service identifier, the device my identify a pre-generated persisted path for the service, including the devices and interfaces of the path, handoffs, and the like.

At block 906, the device may receive performance metrics of devices and interfaces of the persisted path, such as packet delivery rate between provider edge to customer edge, CE WAN interface error rate for PE to CE communications, CE LAN interface error rate for handoffs to CE, and service utilization rate, among others. At block 908, the device may compare performance metrics to various criteria (e.g., as shown in Table 1), detect an event (e.g., event-driven and without a user request) and determine a disposition for the event.

At block 910, the device may cause presentation of a notification of the event to the customer indicating the event detected, whether the customer should further investigate any equipment, and/or whether the communications network provider will resolve the event. Some example dispositions reported in notifications are shown in Table 2.

Figure 9B:
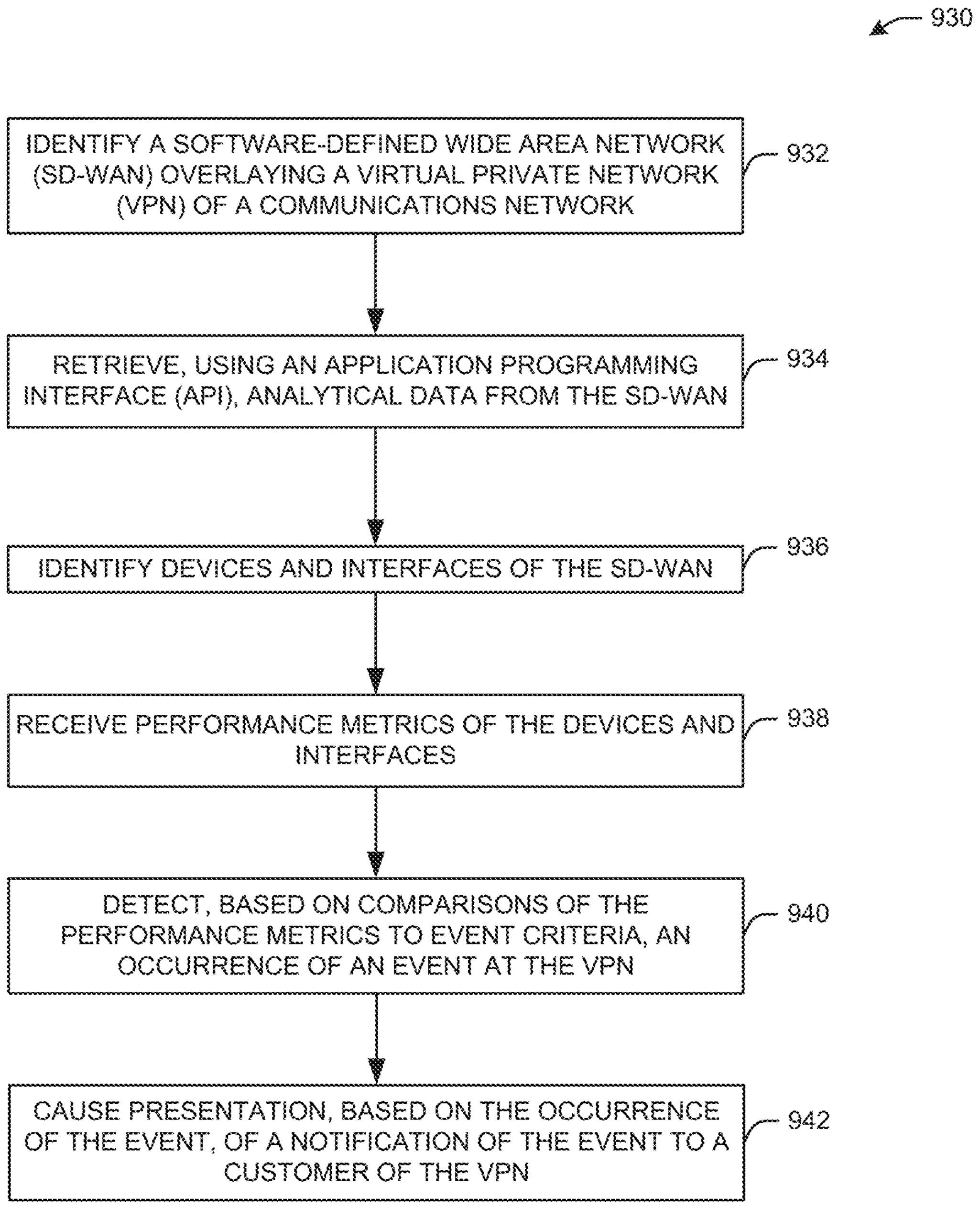

FIG. 9B is a flowchart illustrating a process 930 for using software-defined wide area network (SD-WAN) overlays for evaluating services provided by a communications network in accordance with one embodiment.

At block 930, a software-defined wide-area network (SD-WAN) overlaying a virtual private network (VPN) of a communications network is identified. At block 934, analytical data from the SD-WAN is retrieved using an application programming interface (API).

At block 936, devices and interfaces of the SD-WAN are identified. At block 938, performance metrics of the devices and interfaces are received. At block 940, an occurrence of an event at the VPN is detected based on comparisons of the performance metrics to event criteria. At block 942, a notification of the event is caused to be presented, based on the occurrence of the event, to a customer of the VPN.

Figure 9C:
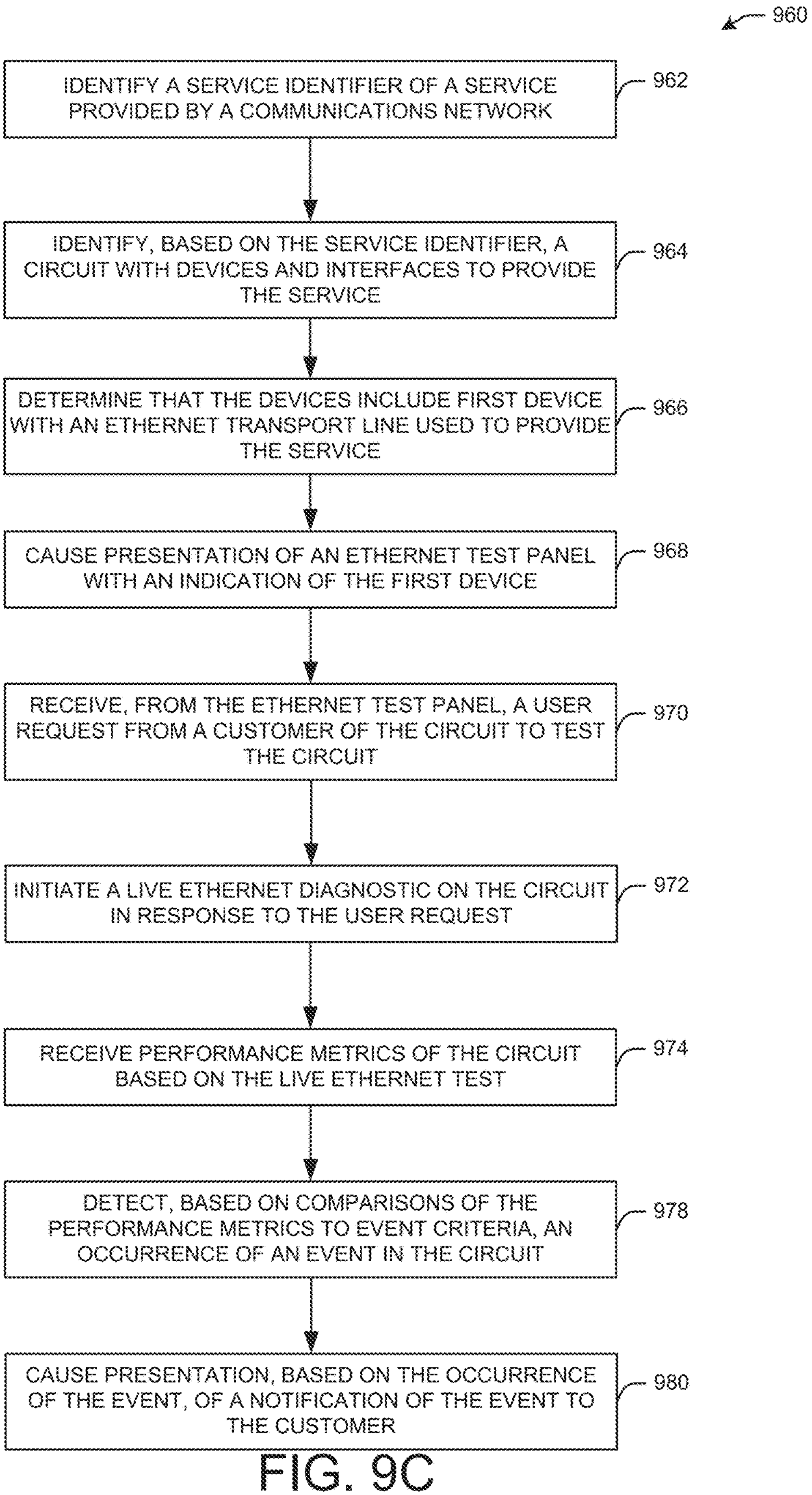

FIG. 9C is a flowchart illustrating a process 960 for automating Ethernet testing for customers of a communications network.

At block 962, a service identifier of a service provided by a communications network is identified. At block 964, a circuit with devices and interfaces to provide the service is identified based on the service identifier. At block 966, it is determined that the devices include a first device with an Ethernet transport line used to provide the service. At block 968, an Ethernet test panel with an indication of the first device is caused to be presented.

At block 970, a user request from a customer of the circuit to test the circuit is received from the Ethernet test panel. At block 972, a live Ethernet diagnostic on the circuit is initiated in response to the user request. At block 974, performance metrics of the circuit are received based on the live Ethernet test. At block 978, an occurrence of an event in the circuit is detected based on comparisons of the performance metrics to event criteria. At block 980, a notification of the event to the customer is caused to be presented based on the occurrence of the event.

It is understood that the above descriptions are for purposes of illustration and are not meant to be limiting.

FIG. 10 is a block diagram illustrating an example of a computing device or computer system 1000 which may be used in implementing the embodiments of the components of the network disclosed above. For example, the computing system 1000 of FIG. 5 may represent at least a portion of the communications network architecture 100 of FIG. 1, and discussed above. The computer system (system) includes one or more processors 1002-1006 and one or more event-driven diagnostics devices 1009 (e.g., representing at least a portion of the communication network architecture 100 of FIG. 1, and/or the system 300 of FIG. 3, capable of performing any operations described with respect to FIGS. 1-9). Processors 1002-1006 may include one or more internal levels of cache (not shown) and a bus controller 1022 or bus interface unit to direct interaction with the processor bus 1012. Processor bus 1012, also known as the host bus or the front side bus, may be used to couple the processors 1002-1006 with the system interface 1024. System interface 1024 may be connected to the processor bus 1012 to interface other components of the system 1000 with the processor bus 1012. For example, system interface 1024 may include a memory controller 1018 for interfacing a main memory 1016 with the processor bus 1012. The main memory 1016 typically includes one or more memory cards and a control circuit (not shown). System interface 1024 may also include an input/output (I/O) interface 1020 to interface one or more I/O bridges 1025 or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-506. Another type of user input device includes cursor control, such as a mouse, a trackball, or cursor direction keys for communicating direction information and command selections to the processors 1002-506 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system outlined in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1016, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method of automating Ethernet testing for customers of a communications network, the method comprising:

identifying, by at least one processor of a device, a service identifier of a service provided by the communications network to a customer;

identifying, by the at least one processor, based on the service identifier, a circuit comprising devices and interfaces used to provide the service;

determining, by the at least one processor, that the devices comprise a first device comprising an Ethernet transport line used to provide the service;

causing presentation, by the at least one processor, of an Ethernet test panel comprising an indication of the first device;

receiving, by the at least one processor, from the Ethernet test panel, a user request from a customer of the circuit to test the circuit;

initiating, by the at least one processor, a live Ethernet diagnostic on the circuit in response to the user request;

receiving, by the at least one processor, based on the live Ethernet diagnostic, performance metrics of the circuit;

detecting, by the at least one processor, based on comparisons of the performance metrics to event criteria, an occurrence of an event in the circuit; and causing presentation, by the at least one processor, based on the occurrence of the event, a notification of the event to the customer.

2. The method of claim 1, further comprising:

determining that the first device is a handoff between a customer edge and a provider edge of the communication network.

3. The method of claim 2, further comprising:

identifying attributes of the circuit in response to determining that the first device is the handoff.

4. The method of claim 1, further comprising:

determining, in response to the user request, that a user network interface (UNI) of the interfaces has been selected, wherein initiating the live Ethernet diagnostic is further in response to determining that the UNI has been selected.

5. The method of claim 1, further comprising:

detecting a service ticket associated with the customer and the circuit, wherein initiating the live Ethernet diagnostic is further in response to detecting the service ticket.

6. The method of claim 1, wherein the circuit is based on a service part module (SPM) path.

7. The method of claim 1, further comprising:

determining that the first device is on a connection list for the live Ethernet diagnostic, wherein initiating the live Ethernet diagnostic is further in response to determining that the first device is on the connection list.

8. A device for automating Ethernet testing for customers of a communications network, the device comprising memory coupled to at least one processor, wherein the at least one processor is configured to:

identify a service identifier of a service provided by the communications network to a customer;

identify, based on the service identifier, a circuit comprising devices and interfaces used to provide the service;

determine that the devices comprise a first device comprising an Ethernet transport line used to provide the service;

cause presentation of an Ethernet test panel comprising an indication of the first device;

receive, from the Ethernet test panel, a user request from a customer of the circuit to test the circuit;

initiate a live Ethernet diagnostic on the circuit in response to the user request;

receive, based on the live Ethernet diagnostic, performance metrics of the circuit;

detect, based on comparisons of the performance metrics to event criteria, an occurrence of an event in the circuit; and cause presentation, based on the occurrence of the event, a notification of the event to the customer.

9. The device of claim 8, wherein the at least one processor is further configured to:

determine that the first device is a handoff between a customer edge and a provider edge of the communication network.

10. The device of claim 9, wherein the at least one processor is further configured to:

identify attributes of the circuit in response to determining that the first device is the handoff.

11. The device of claim 8, wherein the at least one processor is further configured to:

determine, in response to the user request, that a user network interface (UNI) of the interfaces has been selected, wherein to initiate the live Ethernet diagnostic is further in response to determining that the UNI has been selected.

12. The device of claim 8, wherein the at least one processor is further configured to:

detect a service ticket associated with the customer and the circuit, wherein to initiate the live Ethernet diagnostic is further in response to detecting the service ticket.

13. The device of claim 8, wherein the circuit is based on a service part module (SPM) path.

14. The device of claim 8, wherein the at least one processor is further configured to:

determine that the first device is on a connection list for the live Ethernet diagnostic, wherein to initiate the live Ethernet diagnostic is further in response to determining that the first device is on the connection list.

15. A system for automating Ethernet testing for customers of a communications network, the system comprising memory coupled to at least one processor, wherein the at least one processor is configured to:

identify a service identifier of a service provided by the communications network to a customer;

identify, based on the service identifier, a circuit comprising devices and interfaces used to provide the service;

determine that the devices comprise a first device comprising an Ethernet transport line used to provide the service;

cause presentation of an Ethernet test panel comprising an indication of the first device;

receive, from the Ethernet test panel, a user request from a customer of the circuit to test the circuit;

initiate a live Ethernet diagnostic on the circuit in response to the user request;

receive, based on the live Ethernet diagnostic, performance metrics of the circuit;

detect, based on comparisons of the performance metrics to event criteria, an occurrence of an event in the circuit; and cause presentation, based on the occurrence of the event, a notification of the event to the customer.

16. The system of claim 15, wherein the at least one processor is further configured to:

determine that the first device is a handoff between a customer edge and a provider edge of the communication network.

17. The system of claim 16, wherein the at least one processor is further configured to:

identify attributes of the circuit in response to determining that the first device is the handoff.

18. The system of claim 15, wherein the at least one processor is further configured to:

determine, in response to the user request, that a user network interface (UNI) of the interfaces has been selected, wherein to initiate the live Ethernet diagnostic is further in response to determining that the UNI has been selected.

19. The system of claim 15, wherein the at least one processor is further configured to:

detect a service ticket associated with the customer and the circuit, wherein to initiate the live Ethernet diagnostic is further in response to detecting the service ticket.

20. The system of claim 15, wherein the circuit is based on a service part module (SPM) path.

21. The system of claim 15, wherein the at least one processor is further configured to:

determine that the first device is on a connection list for the live Ethernet diagnostic, wherein to initiate the live Ethernet diagnostic is further in response to determining that the first device is on the connection list.

* * * * *